US012631916B2

(12) United States Patent
Chen et al.

(10) Patent No.: US 12,631,916 B2
(45) Date of Patent: May 19, 2026

(54) DISPLAY MODULE AND BACKLIGHT MODULE HAVING CARRIER FILM

(71) Applicant: AUO Corporation, Hsinchu City (TW)

(72) Inventors: Hui-Chuan Chen, Hsinchu City (TW); Yin-Ting Lee, Hsinchu City (TW); Bo-Yuan Su, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/989,598

(22) Filed: Dec. 20, 2024

(65) Prior Publication Data

US 2026/0093145 A1      Apr. 2, 2026

(30) Foreign Application Priority Data

Oct. 1, 2024    (TW) ................................. 113137625

(51) Int. Cl.
G02F 1/13357          (2006.01)
G02F 1/1335           (2006.01)

(52) U.S. Cl.
CPC .. G02F 1/133608 (2013.01); G02F 1/133524 (2013.01)

(58) Field of Classification Search
CPC ......... G02F 1/133314; G02F 1/133317; G02F 1/133325; G02F 1/133328; G02F 1/133608; G02F 1/133524
USPC ...................................... 362/362
See application file for complete search history.

(56) References Cited

U.S. PATENT DOCUMENTS

| | | | |
|---|---|---|---|
| 9,967,992 B2 | 5/2018 | Huang | |
| 2005/0088586 A1 | 4/2005 | Mori et al. | |
| 2012/0026424 A1 | 2/2012 | Youk et al. | |
| 2014/0078443 A1* | 3/2014 | Cheng .............. | G02F 1/133608 |
| | | | 362/97.2 |

FOREIGN PATENT DOCUMENTS

| | | | |
|---|---|---|---|
| CN | 105511570 A | | 4/2016 |
| CN | 206410001 U | | 8/2017 |
| CN | 105592679 B | | 7/2018 |
| CN | 213482751 U | * | 6/2021 |
| JP | H1196821 A | | 4/1999 |
| JP | 2005134422 A | | 5/2005 |
| JP | 2010040341 A | | 2/2010 |
| JP | 2011096821 A | | 5/2011 |
| KR | 1020120012150 A | | 2/2012 |

* cited by examiner

*Primary Examiner* — Keith G. Delahoussaye
(74) *Attorney, Agent, or Firm* — WPAT, PC

(57)          ABSTRACT
A display module and a backlight module are provided. The display module and the backlight module include a back board, a carrier film, and a light board. The carrier film is disposed on the back board and is connected to at least a portion of a periphery of the back board by a first connecting unit. An elastic modulus of the carrier film is smaller than an elastic modulus of the back board. The light board is disposed on the carrier film and is connected to a carrier surface of the carrier film facing towards the light board by a second connecting unit. By disposing the carrier film, the display module or the backlight module can be easily disassembled for rework or recycling without damage. Therefore, the proportion of recyclable components can be increased, which is beneficial to the realization of a circular economy.

20 Claims, 9 Drawing Sheets

10

500

10

10

10

1

1

DISPLAY MODULE AND BACKLIGHT MODULE HAVING CARRIER FILM

CROSS REFERENCE TO RELATED APPLICATION

This application claims the priority benefits of Taiwan Patent Application No. 113137625, filed on Oct. 1, 2024. The entirety of the mentioned above patent application is hereby incorporated by reference herein and made a part of this specification.

TECHNICAL FIELD

The present disclosure relates to a display device and a backlight module having carrier film. In particular, the present disclosure relates to an easily disassembled display device and a backlight module.

BACKGROUND

A traditional liquid crystal display is composed of a backlight module and a liquid crystal display panel disposed on the backlight module, and the backlight module includes a bottom plate, a light source, and an optical film, which are stacked. Taking a direct type backlight module as an example, the light source may be a light emitting diode (LED) light board, and the LED light board is attached to the bottom plate with a double-faced adhesive tape to fix the position of the LED light board on the bottom plate.

Since an assembled liquid crystal display may need to be disassembled for rework or for recycling and reuse of the components after disassembly, the backlight module needs to be disassembled. However, in a traditional backlight module architecture, since the LED light board and the bottom plate are fixed by the double-faced adhesive tape, it is not easy to separate the LED light board from the bottom plate during disassembly. Even if a force is applied to forcibly separate the LED light board from the bottom plate, it is quite possible that excessive force on the LED light board or the bottom plate causes damage or deformation of the components, making the disassembled and separated components difficult to repair or to be recycled.

SUMMARY OF THE DISCLOSURE

An objective of the present disclosure is to provide a display module, wherein a light board and a back board inside the display module can be easily disassembled, reducing the damage generated during disassembly.

An objective of the present disclosure is to provide a backlight module, wherein a light board and a back board inside the backlight module can be easily disassembled, reducing the damage generated during disassembly.

The display module includes a back board, a carrier film, and a light board. The carrier film is disposed on the back board and is connected to at least a portion of a periphery of the back board by a first connecting unit. An elastic modulus of the carrier film is smaller than an elastic modulus of the back board. The light board is disposed on the carrier film and is connected to a carrier surface of the carrier film facing towards the light board by a second connecting unit.

The backlight module includes a back board, a carrier film, and a light board. The carrier film is disposed on the back board and is connected to at least a portion of a periphery of the back board by a first connecting unit. An elastic modulus of the carrier film is smaller than an elastic modulus of the back board. The light board is disposed on the carrier film and is connected to a carrier surface of the carrier film facing towards the light board by a second connecting unit.

By disposing the carrier film, when the display module or the backlight module needs to rework or to be recycled, it is easy to disassemble and separate the light board and the back board quickly without damage. Therefore, the proportion of recyclable components can be increased, which is beneficial to the realization of a circular economy.

DETAILED DESCRIPTION

Figure 1:
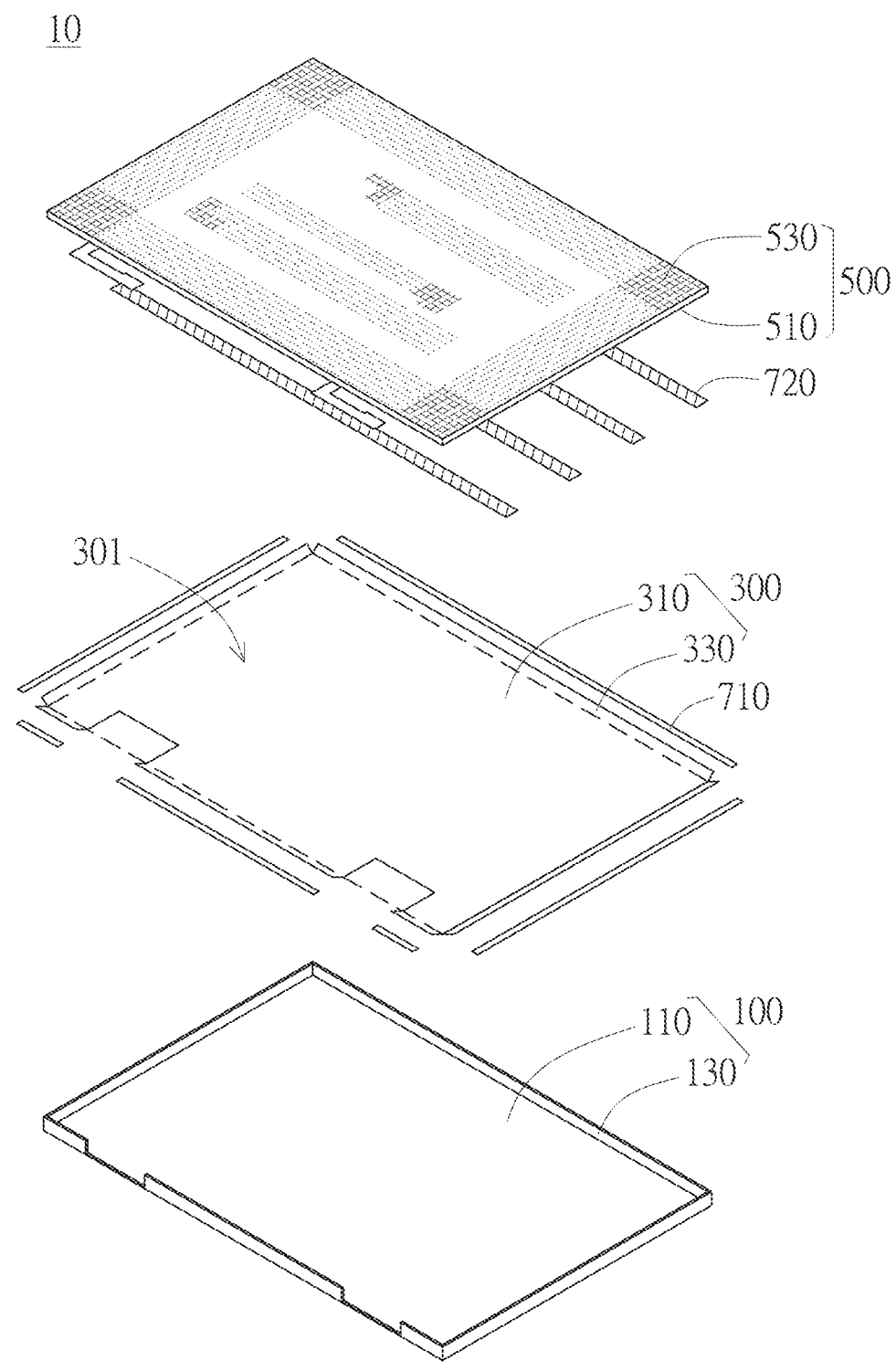
FIG. 1 is a schematic diagram of an embodiment of a backlight module.

Hereinafter, an implementation of a display module disclosed in the present disclosure will be described with specific embodiments and drawings, and those skilled in the art can understand the advantages and benefits of the present disclosure from the disclosure in this specification. However, the content disclosed below is not intended to limit the scope of protection of the present disclosure, and those skilled in the art can implement the present disclosure in various other embodiments based on different perspectives and applications without departing from the spirit of the present disclosure.

In the drawings, the thicknesses of layers, films, panels, regions, etc. are enlarged for clarity. Throughout the specification, the same signs denote the same elements. It should be understood that when an element such as a layer, film, region or substrate is referred to as being "on" or "connected to" another element, it may be directly on or connected to the other element, or there may be other elements therebetween. On the other hand, when an element is referred to as "directly on" or "directly connected to" another element, there are no other elements therebetween. As used herein, "connected" may refer to physically and/or electrically connected.

It should be understood that although the terms "first," "second," "third," etc. may be used for describing various elements, components, regions, layers, and/or portions in the present specification, these elements, components, regions, and/or portions should not be limited by these terms. These terms are used only for distinguishing one element, component, region, layer, or portion from another element, component, region, layer, or portion. Accordingly, a "first element", "first component", "first region", "first layer", or "first portion" discussed below may be referred to as a second element, component, region, layer, or portion without departing from the teachings of the present disclosure.

The terms used herein are for the purpose of describing particular embodiments only and are not intended to be limiting. As used herein, the singular forms "a/an", "one," and "the" are intended to include the plural forms, including "at least one," unless the content clearly dictates otherwise. "Or" means "and/or". As used herein, the term "and/or" includes any and all combinations of one or more of the related listed items. It should also be understood that the terms "comprising" and/or "including", when used in this specification, specify the presence or addition of stated features, regions, integers, steps, operations, elements, and/or components, but do not exclude the presence or addition of one or more other features, regions, integers, steps, operations, elements, components, and/or combinations thereof.

FIG. 1 shows an embodiment of a backlight module 10. In this embodiment, a backlight module 10 includes a back board 100, a carrier film 300, and a light board 500. The back board 100 may be made of, for example, a metal, but is not limited thereto. In this embodiment, the back board 100 has a board body 110 and a side wall 130. The side wall 130 extends vertically from one end of the board body 110 relative to the board body 110. Furthermore, the side wall 130 may be formed by bending a side edge of the board body 110 and is perpendicular to the board body 110, but is not limited thereto. Furthermore, the side wall 130 may surround the periphery of the board body 110, but there may be some gaps or escaping spaces for other elements to be disposed, or the side wall 130 may not be disposed on one of the side edges of the board body 110.

Figure 2:
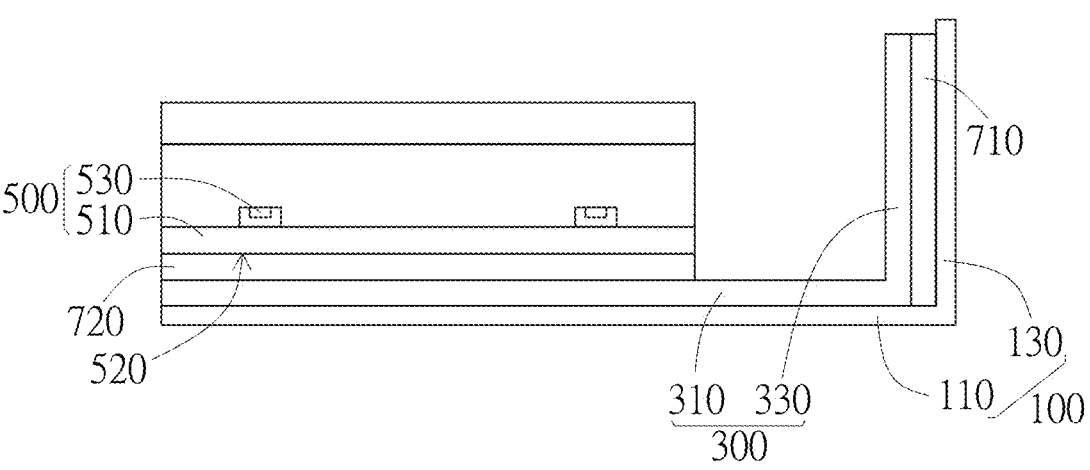
FIG. 2 is a schematic cross-sectional view of the embodiment of the backlight module shown in FIG. 1.

The carrier film 300 is disposed on the back board 100 and is connected to at least a portion of a periphery of the back board 100 by a first connecting unit 710. As shown in FIG. 1 and FIG. 2, the carrier film 300 has a film body 310 and a bending portion 330. The film body 310 is stacked on the board body 110 of the back board 100, and has a carrier surface 301 opposite to the board body 110. The bending portion 330 is bent from a side edge of the film body 310 to form into a long strip shape and extends along the side wall 130. As shown in FIG. 1 and FIG. 2, the bending portion 330 is connected to the side wall 130 by the first connecting unit 710. In this embodiment, the first connecting unit 710 is also formed into a long strip shape to match the shapes of the bending portion 330 and the side wall 130, and both surfaces of the first connecting unit 710 are adhesive to adhere to the surfaces of the bending portion 330 and the side wall 130, respectively. In different embodiments, when the bending portion 330 is not disposed on a portion of a side edge of the film body 310, the first connecting unit 710 may also be disposed at an edge of the film body 310 facing towards the back board 100.

As shown in FIG. 1 and FIG. 2, the light board 500 is disposed on the carrier film 300 and is connected to the carrier surface 301 by a second connecting unit 720. The light board 500 includes a substrate 510 and a light source 530 disposed on the substrate 510. The light source 530 may be a light emitting diode or a sub-millimeter light emitting diode (Mini LED), but in different embodiments, the light source 530 may be other self-luminous light sources. In an embodiment, the carrier film 300 at least partially includes an insulating material, or the carrier film 300 is processed from an insulating material. By such disposition, it can reduce the possibility of a short circuit on a back surface 520 of the light board 500 due to contact with the carrier film 300.

In an embodiment, an elastic modulus of the carrier film 300 is smaller than an elastic modulus of the back board 100. In other words, the carrier film 300 is more elastic than the back board 100. Furthermore, the back board 100 may have better fracture strength than the carrier film 300. For example, when subjected to the same stress, the back board 100 is less likely to break than the carrier film 300, and has better tolerance thereto. In this embodiment, a thickness of the carrier film 300 is less than a thickness of the substrate 510 of the light board 500, but is not limited thereto. When the display module or the backlight module is disassembled, a force may be applied to the carrier film 300. Since the carrier film 300 has better elasticity, the stress is less concentrated on the light board 500 or the back board 100, thereby achieving an effect of protecting the light board 500 or the back board 100. By disposing the carrier film 300, when the display module and the backlight module need to rework or to be recycled, it is easy to disassemble and separate the light board 500 and the back board 100 quickly, and it is not easy to damage the light board and the back board. Therefore, the proportion of recyclable components can be increased, which is beneficial to the realization of a circular economy.

Figure 3:
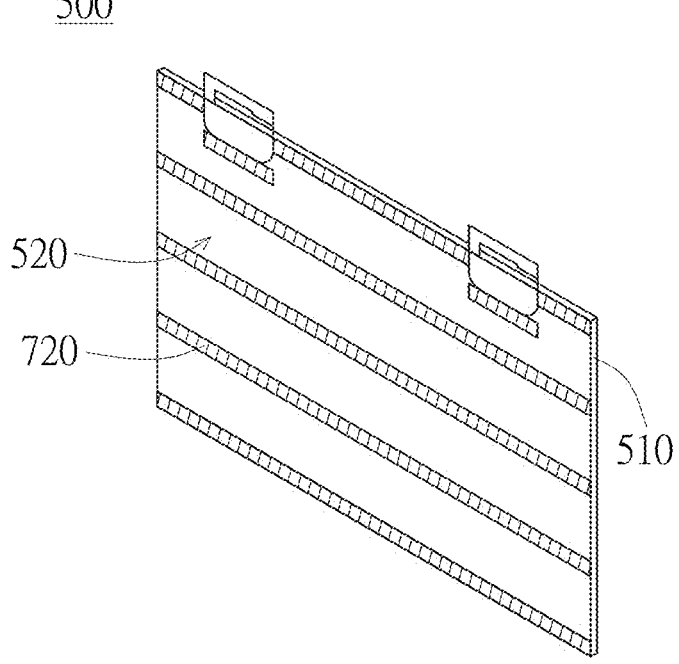
FIG. 3 is a schematic diagram of an embodiment of a light board.

FIG. 3 shows an embodiment of the back surface 520 of the light board 500. As shown in FIG. 3, the second connecting unit 720 may be formed in a long strip shape, and a plurality of second connecting units 720 may be arranged side by side on the back surface of the light board 500 to be connected to the carrier surface 301 of the carrier film 300. The second connecting unit 720 may be a double-faced adhesive tape. In an embodiment, an adhesiveness of the first connecting unit 710 may be greater than an adhesiveness of the second connecting unit 720. Therefore, when the display module or the backlight module is disassembled, a force may be applied to the carrier film 300 to separate the light board 500 and the carrier film 300 from the back board 100 together. Furthermore, the first connecting unit 710 has a stretch-induced deadhesion property in a particular direction, which is also referred to as an easy-to-peel adhesive. The particular direction may be, for example, parallel to a direction extending along a side edge of an intersection between the side wall 130 and the board body 110, i.e., a direction of the side edge of the back board 100. Therefore, when the back board 100 and the light board 500 are disassembled, the adhesiveness of the first connecting unit 710 may be weakened after the first connecting unit 710 is pulled in a particular direction, thereby achieving an effect of easily separating the carrier film 300 from the back board 100. In this way, the components can be easily disassembled and recycled, and a goal of circular economy can be achieved.

In an embodiment, a bottom surface of the carrier film 300 facing towards the back board 100 may have a weak adhesiveness to improve the stability of a structure between the carrier film 300 and the back board 100, and it does not add difficulty to disassembling the light board 500 and the back board 100. However, in different embodiments, the bottom surface may not have this weak adhesiveness. The aforementioned weak adhesiveness is preferably smaller than the adhesiveness of the first connecting unit 710 and the adhesiveness of the second connecting unit 720. The following table shows embodiments of adhesiveness ranges of the first connecting unit 710, the second connecting unit 720, and the bottom surface of the carrier film 300.

| Connecting unit | Adhesiveness (g/cm) |
|---|---|
| Second connecting unit 720 | 1100-3822 |
| First connecting unit 710 | 1427-5000 |
| Weak adhesiveness of bottom surface of carrier film 300 | 40-1100 |

Figure 4:
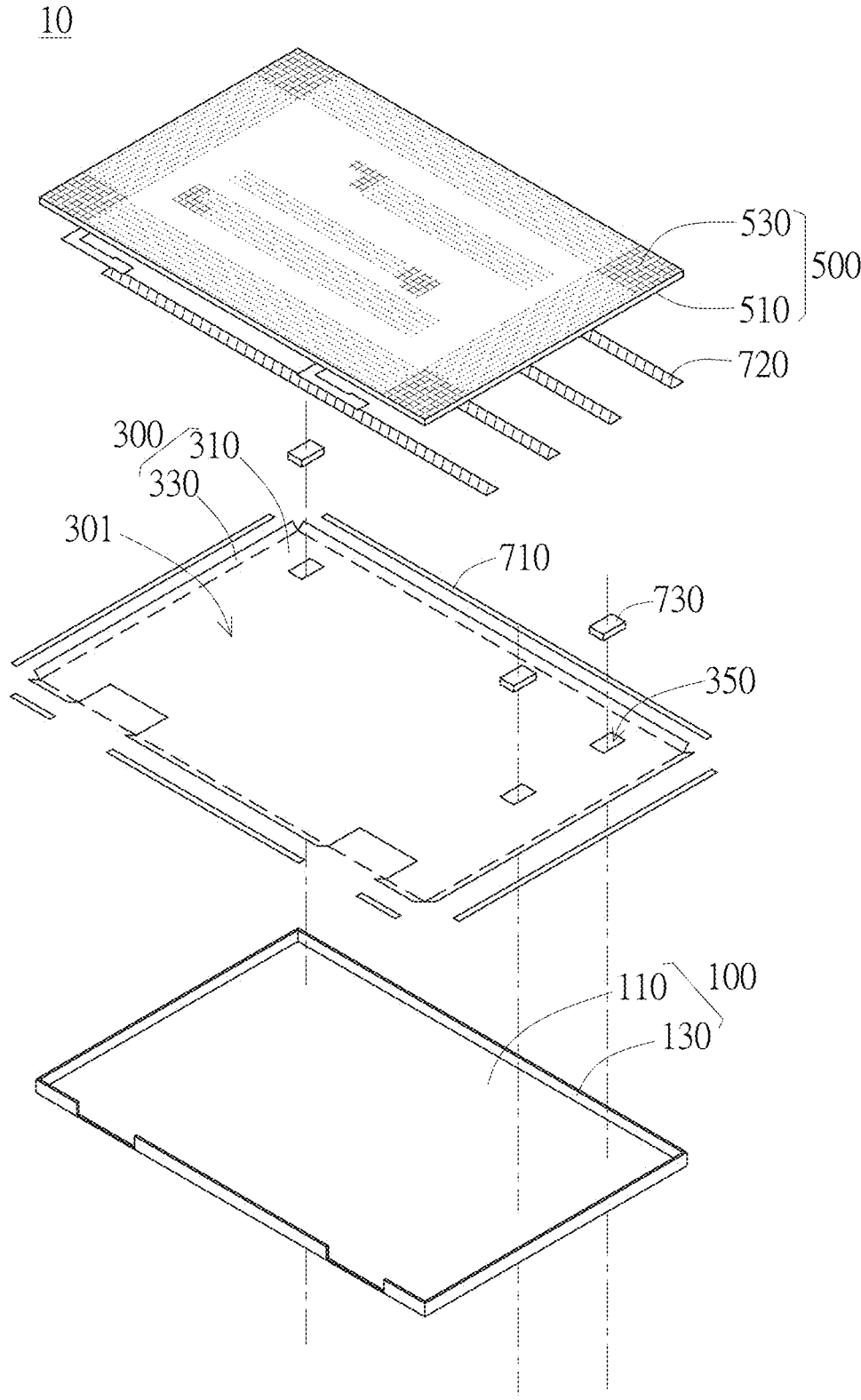
FIG. 4 is a schematic diagram of another embodiment of a backlight module.
Figure 5:
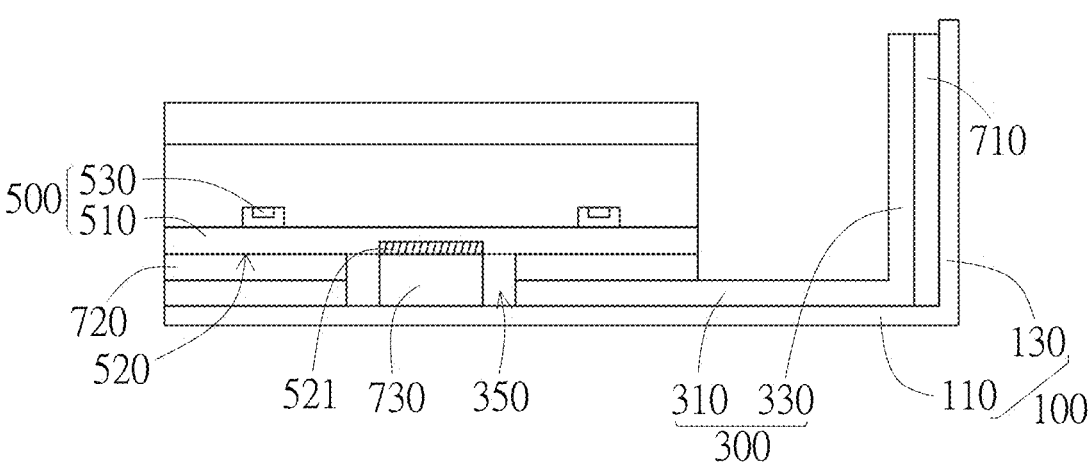
FIG. 5 is a schematic cross-sectional view of the embodiment of the backlight module shown in FIG. 4.

FIG. 4 and FIG. 5 are another embodiment of a backlight module 10. In this embodiment, the film body 310 has a through hole 350 thereon. A third connecting unit 730 is disposed in the through hole 350 and is connected to a back surface of the substrate 510 of the light board 500 and the board body 110 of the back board 100, respectively. By such disposition, the stability of the combination structure between the light board 500 and the back board 100 can be further improved. Furthermore, in this embodiment, a back surface 520 of the light board 500 has a metal exposure region 521 thereon, which is designed for grounding the circuit on the light board 500. The third connecting unit 730 includes a conductive adhesive layer connected to the metal exposure region 521 and the board body 110 of the back board 100, respectively, so as to create a grounding effect.

Figure 6:
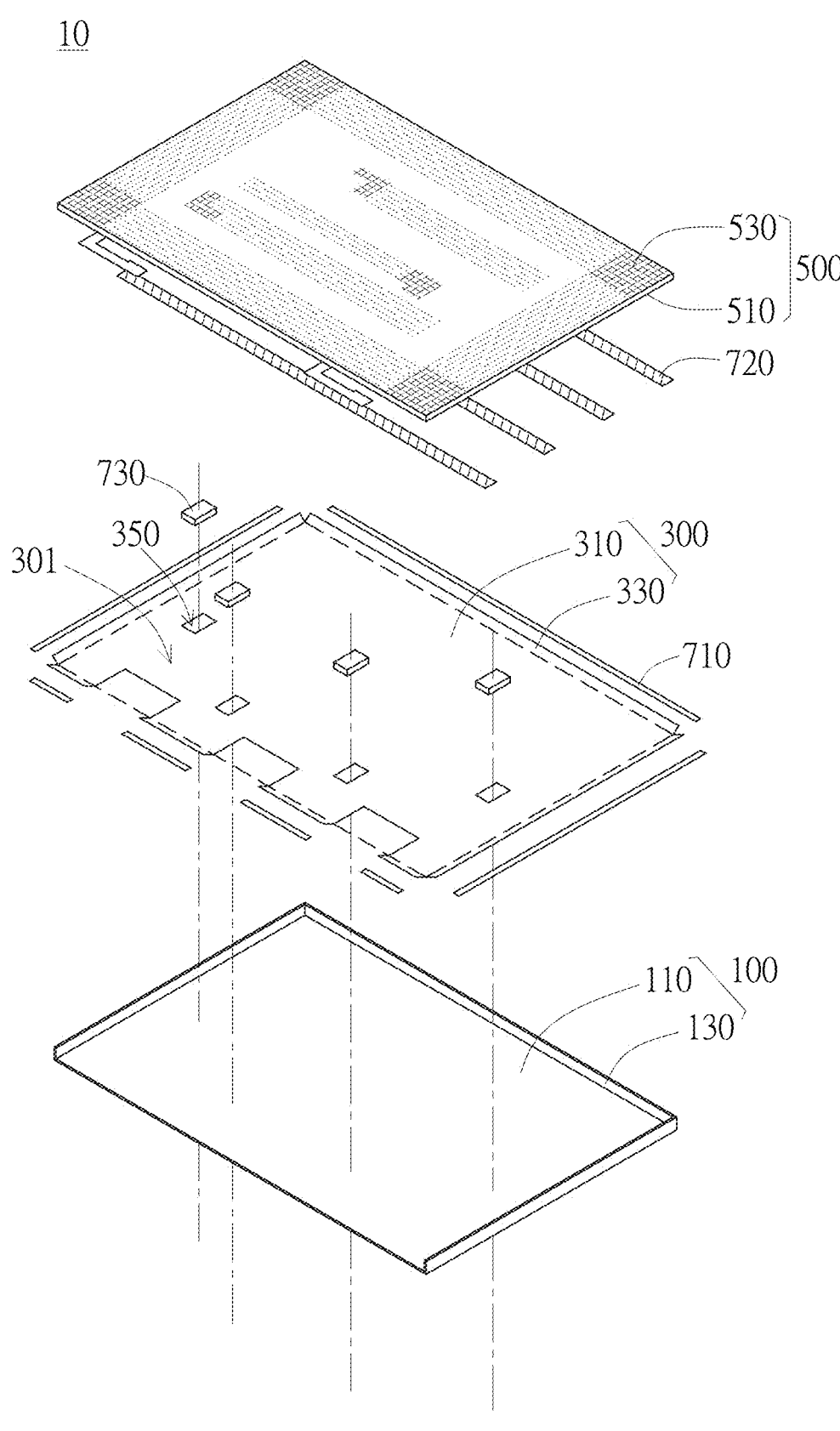
FIG. 6 is a schematic diagram of another embodiment of a backlight module.

FIG. 6 shows an embodiment of a backlight module 10. As shown in FIG. 6, one side of the board body 110 of the back board 100 is not provided with the side wall 130. In this case, the through hole 350 may be disposed on the carrier film 300 close to the region on the board body 110 without the side wall 130, or the number and/or area of the through hole 350 may be increased in the aforementioned region. In addition, the third connecting unit 730 is disposed in the through hole 350 to connect the light board 500 and the back board 100. That is, to reinforce the structural strength of the side edge with no first connecting unit 710 connecting the side wall 130 and the bending portion 330 of the carrier film 300.

Figure 7:
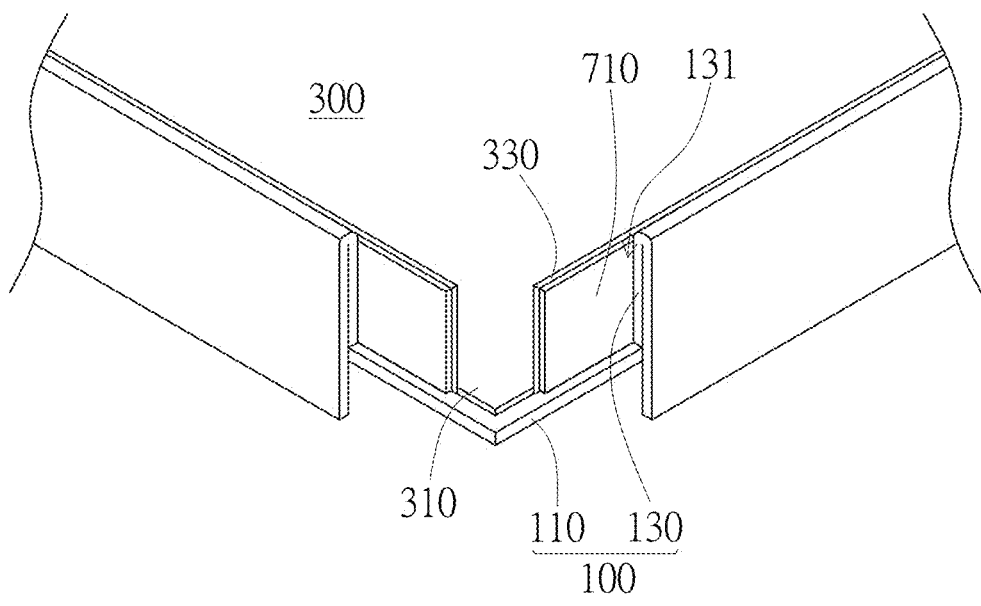
FIG. 7 is a schematic diagram of another embodiment of a backlight module.

FIG. 7 shows another embodiment of a backlight module. As shown in FIG. 7, the side wall 130 has a gap 131 close to an end. However, in different embodiments, the gap 131 may also be disposed elsewhere in the side wall 130. When the bending portion 330 of the carrier film 300 is connected to an inner surface of the side wall 130 by the first connecting unit 710, an end of the first connecting unit 710 is exposed from the gap 131. In other words, the end of the first connecting unit 710 may be contacted from the outside through the gap 131. When the light board 500 and the back board 100 are disassembled, the first connecting unit 710 may be stretched in a direction parallel to the side edge of the back board 100 via the gap 131. By reducing the adhesiveness of the first connecting unit 710 due to the stretch-induced deadhesion properties of the material thereof, it can reduce the difficulty of separating the carrier film 300 and the light board 500 from the back board 100.

Figure 8:
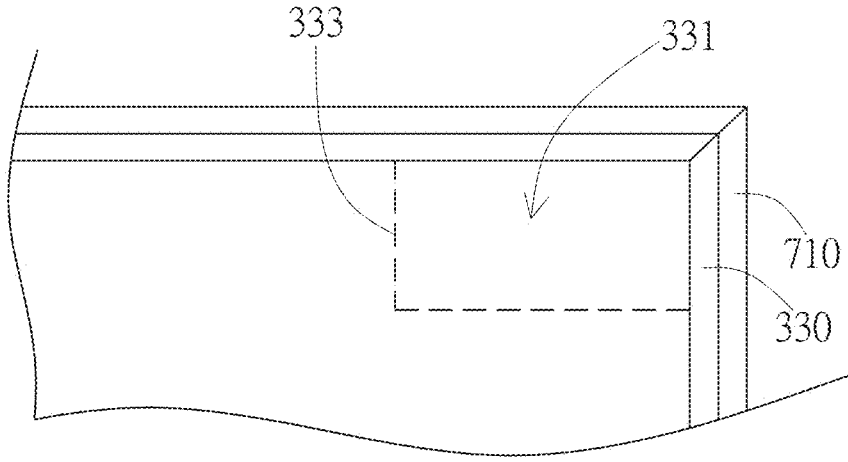
FIG. 8 is a schematic diagram of another embodiment of a backlight module.
Figure 9:
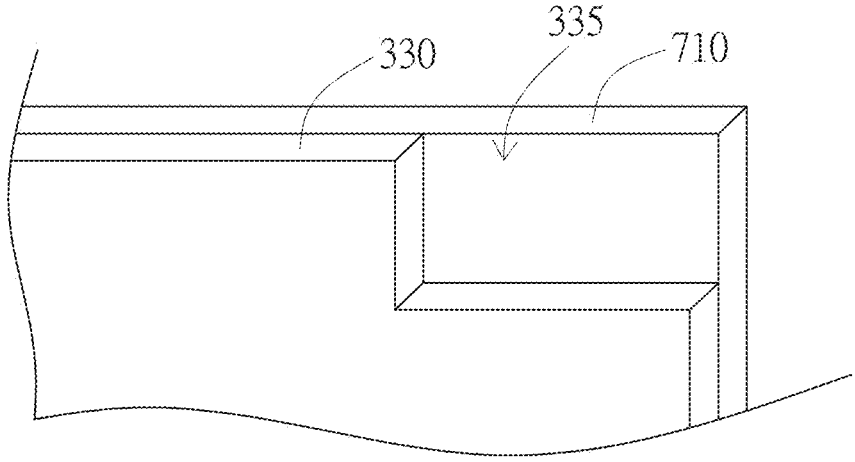
FIG. 9 is a schematic diagram of a state of use of the embodiment shown in FIG. 8.

In an embodiment of FIG. 8, a release portion 331 may be formed at one end of the bending portion 330 of the carrier film 300, and the first connecting unit 710 at least partially overlaps with the release portion 331. In this embodiment, the release portion 331 is partially surrounded by an L-shaped perforation line 333. That is, the perforation line 333 is disposed on at least a portion of a side edge of the release portion 331. The perforation line 333 may be formed on the bending portion 330 in the form of preload points. When the light board 500 and the back board 100 are disassembled, the release portion 331 may be first removed along the perforation line 333, letting the first connecting unit 710 be exposed from a gap 335 left after the release portion 331 is removed, as shown in FIG. 9. Next, the first connecting unit 710 may be stretched in a direction parallel to the side edge of the back board 100 via the gap 335 of the bending portion 330. By reducing the adhesiveness of the first connecting unit 710 due to the material properties of stretch-induced deadhesion properties of the material thereof, it can reduce the difficulty of separating the carrier film 300 and the light board 500 from the back board 100.

Figure 10:
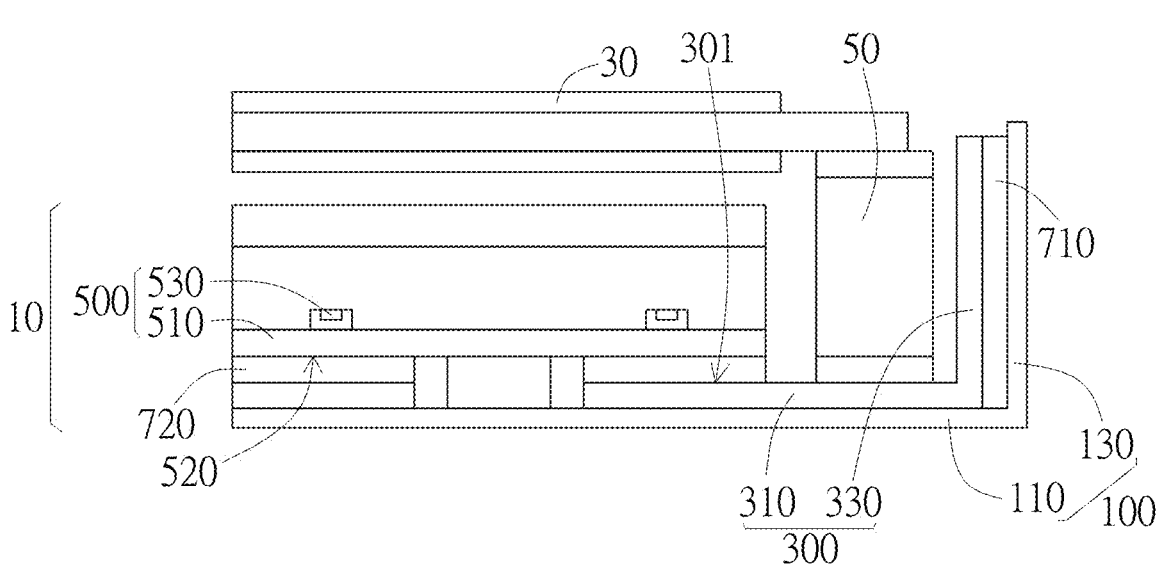
FIG. 10 is a schematic diagram of an embodiment of a display module.

FIG. 10 shows an embodiment of a display module 1. In this embodiment, the display module 1 includes a backlight module 10, a display panel 30, and a frame body 50. The display panel 30 is, for example, a liquid crystal display panel, which is disposed on a light-emitting side of the light board 500 to receive backlight from the backlight module 10 to generate an image. The frame body 50 is disposed on the carrier surface 301 of the carrier film 300, and is located on at least a portion of a side edge of the light board 500. A top of the frame body 50 supports a edge of the back surface of the display panel 30 to maintain a distance between the display panel 30 and the light board 500.

Figure 11:
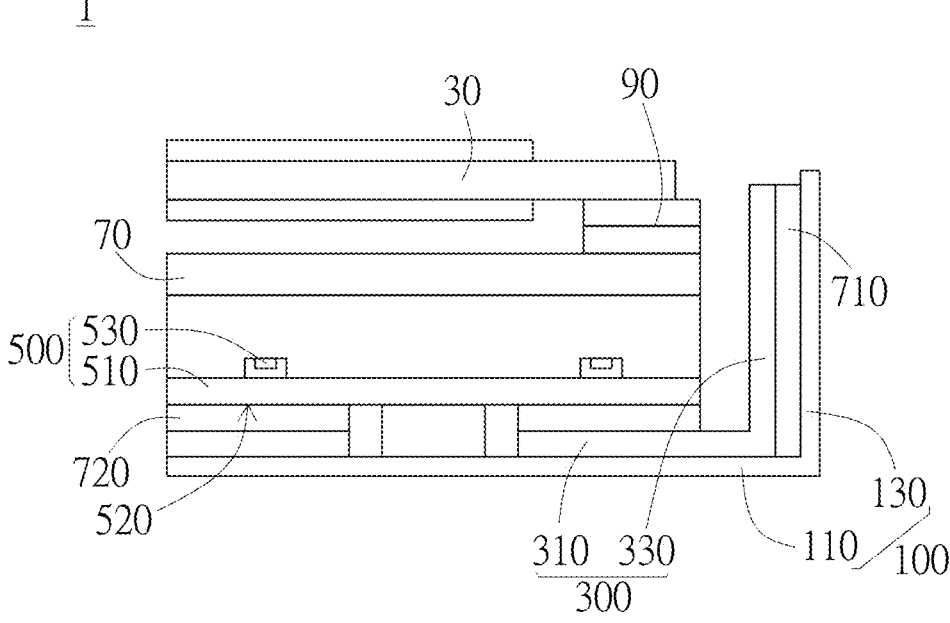
FIG. 11 is a schematic diagram of another embodiment of a display module.

FIG. 11 shows another embodiment of a display module 1. As shown in FIG. 11, one or more optical films 70 are arranged between the light board 500 and the display panel 30. Different from the embodiment shown in FIG. 10, in this embodiment, the display panel 30 is directly disposed on the optical film 70 with a support 90 instead of a frame body. In this way, a width of the frame can be further reduced.

Figure 12:
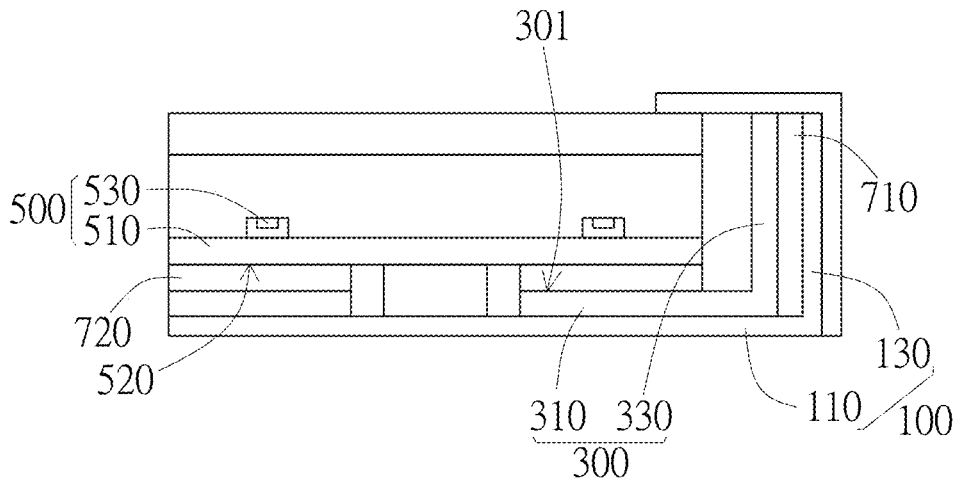
FIG. 12 is a schematic diagram of another embodiment of a display module.

FIG. 12 shows another embodiment of a display module 1. In this embodiment, the display module 1 is substantially the same as the aforementioned embodiments of the backlight module 10, each include a back board 100, a carrier film 300, and a light board 500. But in this embodiment, the light board 500 has an image display function. As shown in FIG. 12, the back board 100 has a board body 110 and a side wall 130. The side wall 130 extends vertically from one end of the board body 110 relative to the board body 110. Furthermore, the side wall 130 may be formed by bending a side edge of the board body 110 and is perpendicular to the board body 110, but is not limited thereto. Furthermore, the side wall 130 may surround the periphery of the board body 110, but there may be some gaps or escaping spaces for other elements to be disposed, or the side wall 130 may not be disposed on one of the side edges of the board body 110.

The carrier film 300 is disposed on the back board 100 and is connected to at least a portion of a periphery of the back board 100 by a first connecting unit 710. As shown in FIG. 12, the carrier film 300 has a film body 310 and a bending portion 330. The film body 310 is stacked on the board body 110 of the back board 100, and has a carrier surface 301 opposite to the board body 110. The bending portion 330 is bent from a side edge of the film body 310 to form into a long strip shape and extends along the side wall 130. As shown in FIG. 12, the bending portion 330 is connected to the side wall 130 by the first connecting unit 710. In this embodiment, the first connecting unit 710 is also formed into a long strip shape to match the shapes of the bending portion 330 and the side wall 130, and both surfaces of the first connecting unit 710 are adhesive to adhere to the surfaces of the bending portion 330 and the side wall 130, respectively. In different embodiments, when the bending portion 330 is not disposed on a portion of a side edge of the film body 310, the first connecting unit 710 may also be disposed at an edge of the film body 310 facing towards the back board 100.

As shown in FIG. 12, the light board 500 is disposed on the carrier film 300 and is connected to the carrier surface 301 by a second connecting unit 720. The light board 500 includes a substrate 510 and a light source 530 disposed on the substrate 510. The pixels for displaying images is formed in the light board 500 by the light source 530 disposed on the substrate 510, thereby achieving an effect of displaying images. The light source 530 may be a micro light emitting diode (Micro LED), but in different embodiments, the light source 530 may be an organic light emitting diode (OLED) or other self-luminous light sources. In an embodiment, the carrier film 300 at least partially includes an insulating material, or the carrier film 300 is processed from an insulating material. By such disposition, it can reduce the possibility of a short circuit on a back surface 520 of the light board 500 due to contact with the carrier film 300. Furthermore, the elements of the embodiment shown in FIG. 12 may be adjusted and combined according to the description of the elements set forth in the aforementioned embodiments. By disposing the carrier film 300, when the display module needs to rework or to be recycled, it is easy to disassemble and separate the light board 500 and the back board 100 quickly, and it is not easy to damage the light board and the back board. Therefore, the proportion of recyclable components can be increased, which is beneficial to the realization of a circular economy.

The above content is merely a few preferred embodiments of the present disclosure. It should be noticed that various changes and modifications may be made to the present disclosure without departing from the spirit and principles of the present disclosure. It should be understood by those of ordinary skill in the art that the present disclosure is defined by the scope of the appended patent claims, and that various possible substitutions, combinations, modifications, and adaptations, which align with the intent of the present disclosure, fall within the scope of the present disclosure as defined by the appended patent claims.

What is claimed is:

1. A display module, comprising:
a back board;
a carrier film, disposed on the back board and connected to at least a portion of a periphery of the back board by a first connecting unit; and
a light board, disposed on the carrier film and connected to a carrier surface of the carrier film facing towards the light board by a second connecting unit,
wherein an elastic modulus of the carrier film is smaller than an elastic modulus of the back board.

2. The display module of claim 1, further comprising a third connecting unit, wherein the carrier film has a through hole, and the third connecting unit being at least partially located in the through hole and connected to the light board and the back board respectively.

3. The display module of claim 2, wherein the light board has a back surface having a metal exposure region thereon, and the third connecting unit comprises a conductive adhesive layer connected to the metal exposure region and the back board respectively.

4. The display module of claim 1, wherein the carrier film comprises an insulating material.

5. The display module of claim 1, wherein the back board comprises:
a board body, the carrier film being disposed on the board body; and
a side wall, extending vertically from one end of the board body relative to the board body;

wherein the carrier film has a bending portion bending relative to the carrier surface, and the bending portion is connected to the side wall by the first connecting unit.

6. The display module of claim 5, wherein the side wall has a gap, and the first connecting unit is exposed from the gap.

7. The display module of claim 6, wherein the gap is located at an end of the side wall.

8. The display module of claim 5, wherein one end of the bending portion has a release portion, at least a portion of a side edge of the release portion being provided with a perforation line; and the first connecting unit at least partially overlaps with the release portion.

9. The display module of claim 5, wherein the first connecting unit has a stretch-induced deadhesion stretch-induced deadhesion property in a direction extending along a side edge of an intersection between the side wall and the board body.

10. The display module of claim 5, further comprising a third connecting unit, wherein the carrier film has a through hole, and the third connecting unit is at least partially located in the through hole and connected to the light board and the back board respectively, wherein the through hole is located close to an end of the board body without the side wall.

11. The display module of claim 1, wherein an adhesiveness of the first connecting unit is greater than an adhesiveness of the second connecting unit.

12. The display module of claim 1, wherein the carrier film has a bottom surface facing towards the back board, and the bottom surface has a weak adhesiveness less than an adhesiveness of the first connecting unit and an adhesiveness of the second connecting unit.

13. The display module of claim 1, wherein a thickness of the carrier film is less than a thickness of a substrate of the light board.

14. The display module of claim 1, further comprising:
a display panel, disposed on a light-emitting side of the light board; and
a frame body, disposed on the carrier surface, and located on at least a portion of a side edge of the light board, wherein a top of the frame body supports an edge of a back surface of the display panel.

15. A backlight module, comprising:
a back board;
a carrier film, disposed on the back board and connected to at least a portion of a periphery of the back board by a first connecting unit; and
a light board, disposed on the carrier film and connected to a carrier surface of the carrier film facing towards the light board by a second connecting unit,
wherein an elastic modulus of the carrier film is smaller than an elastic modulus of the back board.

16. The backlight module of claim 15, further comprising a third connecting unit, wherein the carrier film has a through hole, and the third connecting unit is at least partially located in the through hole and connected to the light board and the back board respectively.

17. The backlight module of claim 15, wherein the back board comprises:
a board body, the carrier film being disposed on the board body; and
a side wall, extending vertically from one end of the board body relative to the board body;

wherein the carrier film has a bending portion bending relative to the carrier surface, and the bending portion is connected to the side wall by the first connecting unit.

18. The backlight module of claim 17, wherein the side wall has a gap, and the first connecting unit protrudes out of the gap.

19. The backlight module of claim 17, wherein one end of the bending portion has a release portion, at least a portion of a side edge of the release portion being provided with a perforation line; and the first connecting unit at least partially overlaps with the release portion.

20. The backlight module of claim 17, wherein the first connecting unit has a stretch-induced deadhesion property in a direction extending along a side edge of an intersection between the side wall and the board body.

* * * * *